US006657317B2

(12) United States Patent
Ishiyama et al.

(10) Patent No.: US 6,657,317 B2
(45) Date of Patent: Dec. 2, 2003

(54) ELECTRONIC DEVICE WITH ERRONEOUS OPERATION BUTTON STATE JUDGING

(75) Inventors: Hideshi Ishiyama, Kawagoe (JP); Kazuo Yabe, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 124 days.

(21) Appl. No.: 10/026,829

(22) Filed: Dec. 27, 2001

(65) Prior Publication Data

US 2002/0079745 A1 Jun. 27, 2002

(30) Foreign Application Priority Data

Dec. 27, 2000 (JP) ........................................ 2000-398642

(51) Int. Cl.[7] .............................................. H01H 83/00
(52) U.S. Cl. ........................ 307/10.1; 307/130; 701/36
(58) Field of Search .............................. 307/10.1, 130; 701/2, 36; 702/82

(56) References Cited

U.S. PATENT DOCUMENTS

| | | | | |
|---|---|---|---|---|
| 5,717,386 A | * | 2/1998 | Sakagami et al. | 307/10.1 |
| 5,790,042 A | * | 8/1998 | Echigo et al. | 307/10.1 |
| 5,811,891 A | * | 9/1998 | Yanase | 307/10.1 |
| 5,949,149 A | * | 9/1999 | Shitanaka et al. | 307/10.1 |
| 6,147,417 A | * | 11/2000 | Ueno | 307/10.1 |
| 6,256,558 B1 | * | 7/2001 | Sugiura et al. | 701/36 |

* cited by examiner

*Primary Examiner*—Jeffrey Sterrett
(74) *Attorney, Agent, or Firm*—Nixon & Vanderhye P.C.

(57) ABSTRACT

An electronic device does not carry out control operation corresponding to a signal from an operation button which is kept in pressed state when electric power is supplied. When electric power is supplied, the voltage changing depending on open and closed state of switches SW1 to SW4 corresponding to operation buttons to be manipulated is judged to be a specified value or not. When the voltage is not judged to be specified value, the control unit does not carry out control operation corresponding to the signal from the operation button that has been in pressed state.

4 Claims, 4 Drawing Sheets

ELECTRONIC DEVICE WITH ERRONEOUS OPERATION BUTTON STATE JUDGING

BACKGROUND OF THE INVENTION

1. Field of the Invention

The present invention relates to an electronic device having an operation button manipulated by pressing it.

2. Description of Related Art

Recently, in car-mount acoustic devices, particularly among electronic devices, an operation button to be manipulated by pressing and having the same function as the operation button as provided in the device main body is placed on the steering wheel. It is intended to manipulate the operation button by remote control by connecting the operation button on the steering wheel and the device main body. The operation button provided on the steering wheel is usable simultaneously with the operation button of the device main body. Out of these operation buttons, the operation button pressed first is put in effect, and the operation according to manipulation of that operation button is carried out.

An example of operation button placed on the steering wheel to be manipulated by pressing is a volume UP/DOWN button for controlling the volume level of the power amplifier. As the volume UP/DOWN button is pressed by the user, operation signals showing the duration of the pressing operation and number of times of the pressing operation are supplied to the microcomputer. The microcomputer controls the power amplifier according to the operation signals to vary the gain thereof.

However, if dust particles are caught in the volume UP/DOWN button placed on the steering wheel or if the driver applies a larger force than required for pressing while turning the steering wheel, the pressed volume UP/DOWN button may be stuck in the pressed state without returning to the initial state. In such a case, if the power source of the device main body is turned on by the driver while the volume UP button is in pressed state, the operation signal from the volume UP button on the steering wheel is supplied to the microcomputer continuously from this moment. Thus, the volume level of the power amplifier increases, and the sound volume delivered from the speaker goes too much higher. As a result, the driver is exposed to an intolerable sound delivered from the speaker.

SUMMARY OF THE INVENTION

The present invention has been achieved in order to solve the above problems. It is an object of this invention to provide an electronic device configured not to operate according to an operation signal from an operation button in pressed state, if the operation button is in the pressed state when the power is supplied.

According to one aspect of the present invention, there is provided an electronic device including: an operation button to be manipulated by pressing; a judging unit for judging whether or not a voltage changed by pressing the operation button is equal to a specified value when an electric power is supplied; and a control unit for preventing a control corresponding to the signal from the operation button in pressed state from being executed when the judging unit judges that the voltage is not equal to the specified value.

In accordance with the electronic device thus configured, an operation button to be manipulated by a user is provided. When the electronic power is supplied to the electronic device, it is judged whether or not a voltage changed by pressing the operation button is equal to a specified value. If the voltage is equal to the specified value, the corresponding control is executed. On the contrary, if the voltage is not equal to the specified value, the corresponding control is not executed. For example, if the operation button is improperly being continuously pressed for some reason, the voltage does not take the specified value, and hence the corresponding control is prevented. The specified value may be a voltage showing the state that the operation button is not pressed.

According to another aspect of the present invention, there is provided an electronic device including: a first operation button provided in a device main body to be manipulated by pressing; a second operation button provided at a position remote from the device main body to be manipulated by pressing; a judging unit for judging whether a voltage changed by pressing of the first operation button and second operation button is equal to a first specified value or a second specified value when an electric power is supplied; and a control unit for preventing a control corresponding to the signal from the second operation button in pressed state from being executed when the judging unit judges that the voltage is not equal to the first specified value, and for preventing the control corresponding to the signal from the first operation button in pressed state from being executed when the judging unit judges that the voltage is not equal to the second specified value.

In accordance with the electronic device thus configured, a first operation button to be manipulated by a user is provided on the device main body, and a second operation button is provided remotely from the device main body. When the electronic power is supplied to the electronic device, it is judged whether or not a voltage changed by pressing the operation button is equal to one of a first specified value and a second specified value. If the voltage is not equal to the first specified value, the control corresponding to pressing the second operation button is not executed. If the voltage is not equal to the second specified value, the control corresponding to the first operation button is not executed. For example, if the operation button is improperly being continuously pressed for some reason, the voltage does not take the specified value, and hence the corresponding control is prevented. The specified value may be a voltage showing the state that the operation button is not pressed.

In an embodiment, the first specified value may be a voltage showing the state that the second operation button is not pressed, and the second specified value may be a voltage showing the state that the first operation button is not pressed.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENT

The embodiment of the present invention will be described hereinafter with reference to the drawings. This embodiment relates to a car-mount acoustic device 100 including an UP button to be manipulated for raising the volume level of a power amplifier provided in a device main body, a DOWN button to be manipulated to lower it, and an UP button and a DOWN button placed on a steering wheel having the same functions as the corresponding buttons provided in the device main body. It is noted that, in this invention, the types of operation buttons are not limited to these examples.

Figure 1:
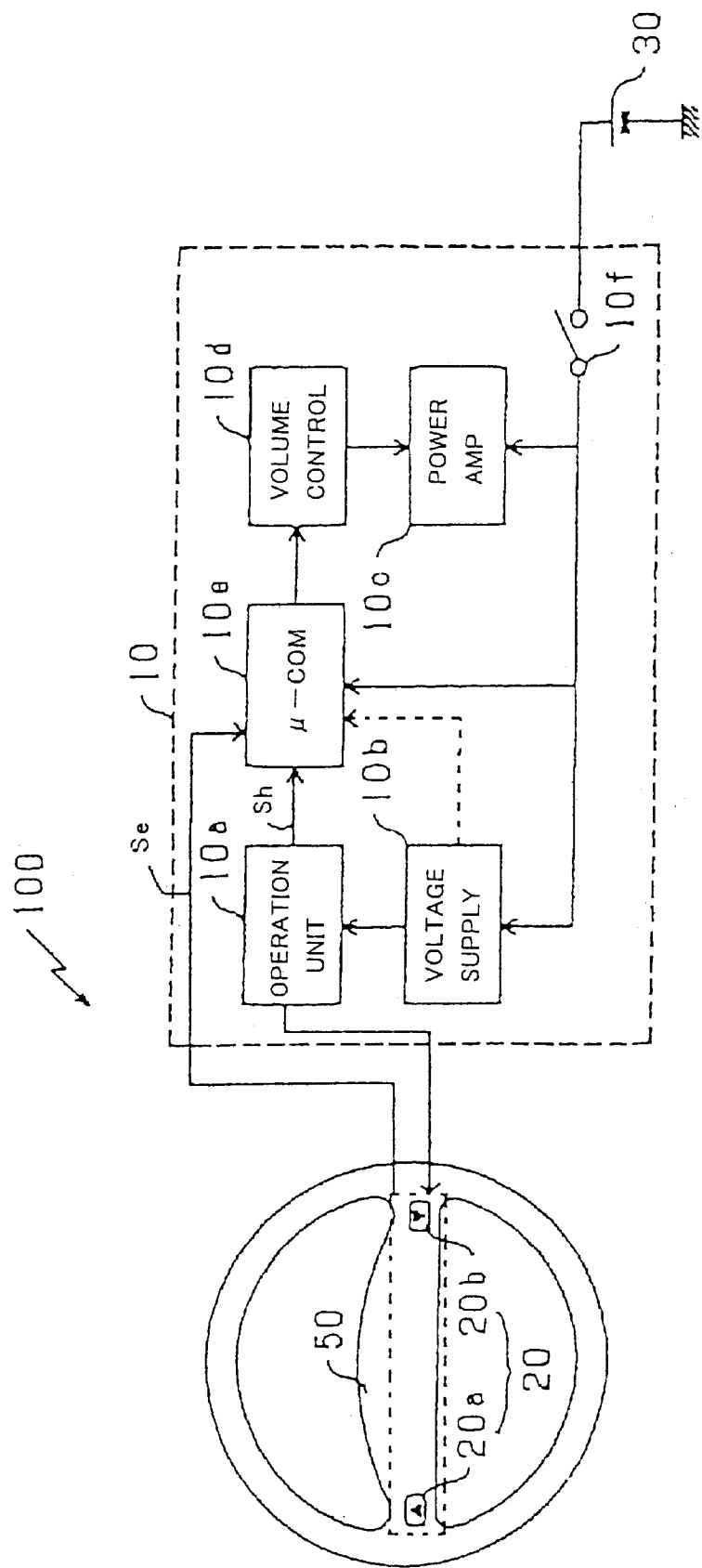
FIG. 1 shows a block diagram of a car-mount acoustic device according to an embodiment of the invention.
Figure 2:
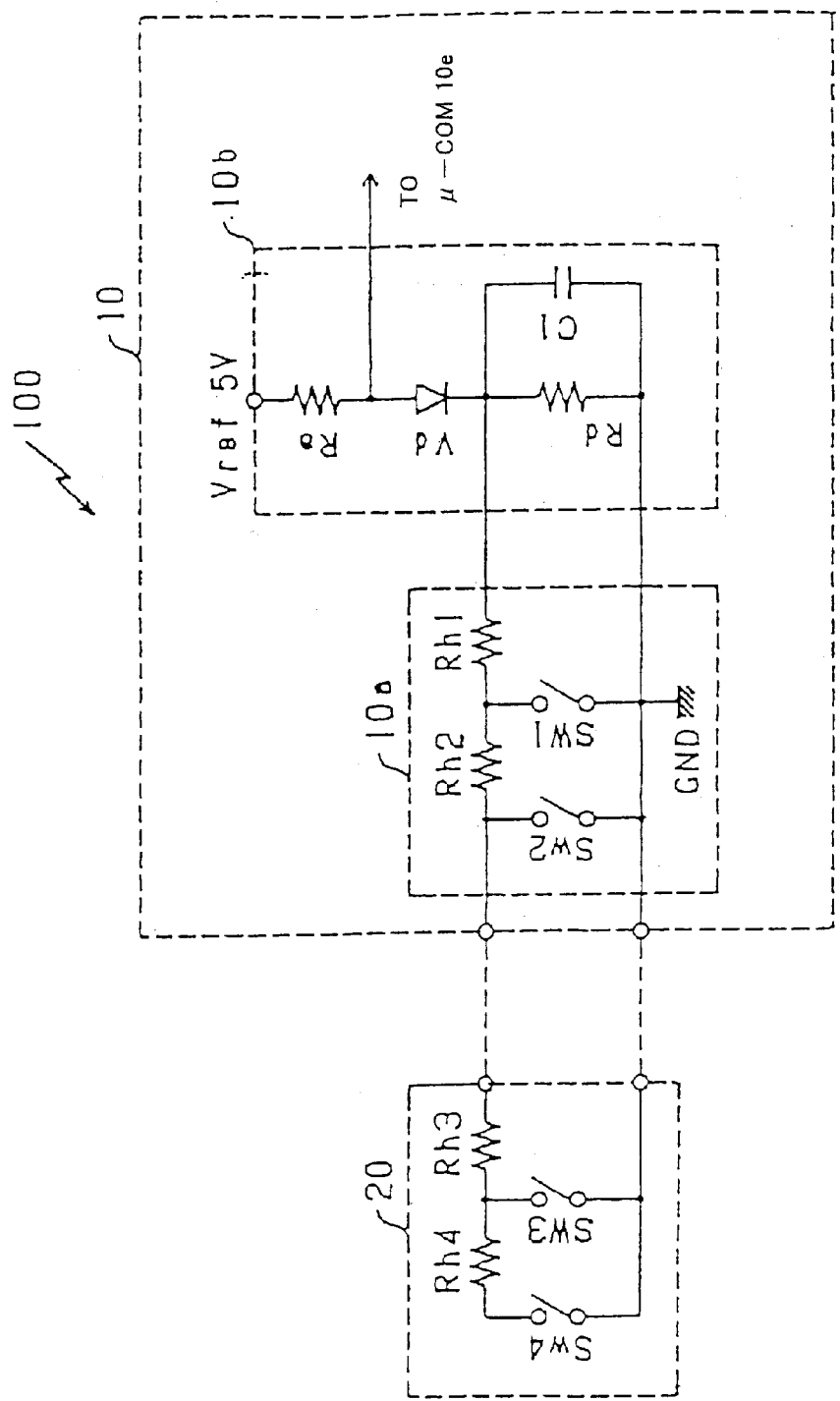
FIG. 2 shows a circuit diagram of an operation unit, a voltage supply unit and a remote control unit that constitute the car-mount acoustic device of the embodiment.

First, the configuration of the car-mount acoustic device 100 of the embodiment will be explained by referring to FIG. 1 and FIG. 2. FIG. 1 shows a block diagram of the car-mount acoustic device 100 of the embodiment, and FIG. 2 shows a specific circuit diagram of a remote control unit 20, an operation unit 10a and a voltage supply unit 10b that constitute the car-mount acoustic device 100.

As shown in FIG. 1, the car-mount acoustic device 100 includes a device main body 10 and a remote control unit 20. The device main body 10 includes an operation unit 10a having an UP button and a DOWN button to be manipulated by the user by pressing, a voltage supply unit 10b for supplying voltage to the operation unit 10a and to the remote control unit 20 through the operation unit 10a, a power amplifier 10c, a volume control circuit 10d for controlling the power amplifier 10c, a microcomputer 10e for controlling the operation in the device, and a power switch 10f. When the UP button or DOWN button is pressed after voltage is supplied from the voltage supply unit 10b, the operation unit 10a supplies an operation signal Sh corresponding to the pressing operation to the microcomputer 10e. The microcomputer 10e controls the volume control circuit 10d according to this operation signal Sh.

The remote control unit 20 is provided on a steering wheel 50, and includes an UP button 20a and a DOWN button 20b to be manipulated by the user by pressing. The remote control unit 20 is connected to the device main body 10 by wiring, etc. When the UP button 20a or DOWN button 20b is pressed after voltage is supplied from the voltage supply unit 10b, the remote control unit 20 supplies an operation signal Se corresponding to the pressing operation to the microcomputer 10e. The microcomputer 10e controls the volume control circuit 10d according to this operation signal Se.

Reference numeral 30 indicates a battery for supplying power to the device main body 10. That is to say, by turning on the power switch 10f, power is supplied from the battery 30, and the device main body 10 is activated.

Next, by referring to FIG. 2, a specific circuit configuration of the operation unit 10a, the voltage supply unit 10b and the remote control unit 20 will be explained.

First, the circuit configuration of the voltage supply unit 10b will be explained. The voltage supply unit 10b is configured by connecting two resistors Ra, Rd and a voltage shifting diode Vd in series between a 5V power source and an earth potential (GND), and by connecting a noise eliminating capacitor C1 to the resistor Rd in a parallel fashion. An intersection voltage of the resistor Ra and the diode Vd is supplied to the microcomputer 10e. An intersection voltage of the diode Vd and the resistor Rd is supplied to the operation unit 10a and the remote control unit 20.

Next, the circuit configuration of the operation unit 10a will be explained. The operation unit 10a includes two resistors Rh1, Rh2 and two switches SW1, SW2. The resistor Rh1 is connected in series to one end of the switch SW1 and one end of the resistor Rd, and the resistor Rh2 is connected in series to one end of the switch SW2 and one end of the switch SW1.

Next, the circuit configuration of the remote control unit 20 will be explained. The remote control unit 20 includes two resistors Rh3, Rh4 and two switches SW3, SW4. The resistor Rh3 is connected in series to one end of the switch SW3 and one end of the switch SW2, and the resistor Rh4 is connected in series to one end of the switch SW4 and one end of the switch SW3.

Thus, the operation unit 10a and the remote control unit 20 have four resistors Rh1 to Rh4 connected in series to the intersection of the diode Vd and resistor Rd of the voltage supply unit 10b, and are designed to connect the intersections of the respective resistors to the earth potential by means of the switches SW1 to SW4.

The switch SW1 corresponds to the UP button of the operation unit 10a, and the switch SW2 corresponds to the DOWN button of the operation unit 10a. The switch SW3 corresponds to the UP button 20a of the remote control unit 20, and the switch SW4 corresponds to the DOWN button 20b of the remote control unit 20. These switches SW1 to SW4 are open when the corresponding operation buttons are not pressed, and are closed when the corresponding buttons are pressed.

The operation unit 10a, voltage supply unit 10b and remote control unit 20 thus designed are connected in the following mutual relations when the switches SW1 to SW4 are closed.

When the switch SW1 is closed, the resistor Rh1 is connected to the earth potential, and therefore the resistor Rd is connected in parallel to the resistor Rh1. When the switch SW2 is closed, the two resistors Rh1 and Rh2 connected in series are connected to the earth potential, and therefore the resistor Rd is connected in parallel to the two resistors Rh1, Rh2 serially connected.

When the switch SW3 is closed, the three resistors Rh1, Rh2, Rh3 connected in series are connected to the earth potential, and therefore the resistor Rd is connected in parallel to the three resistors Rh1, Rh2, Rh3 serially connected. When the switch SW4 is closed, the four resistors Rh1, Rh2, Rh3, Rh4 connected in series are connected to the earth potential, and therefore the resistor Rd is connected parallel to the four resistors Rh1, Rh2, Rh3, Rh4 serially connected.

For example, by apply specific numerical values to the resistors Ra, Rd, Rh1 to Rh4 and diode Vd configuring the voltage supply unit 10b, the operation unit 10a and the remote control unit 20, changes of intersection voltage of resistor Ra and diode Vd are explained, for the cases when all switches SW1 to SW4 are open and when the switches SW1 to SW4 are closed.

In the voltage supply unit 10b, it is assumed that the resistance value of the resistor Ra is 470 Ω, the resistance value of the resistor Rd is 10 kΩ, and the forward voltage of the diode Vd (the forward voltage varies with the supplied current value) is a constant 0.6 V. When a 5 V power source is supplied, a voltage of about 4.8 V is output at the intersection of the resistor Ra and the diode Vd. The voltage of about 4.8V, generated at the intersection of the voltage supply unit 10, is a voltage generated when all switches SW1 to SW4 are open, that is to say, no operation button is pressed. This voltage will be called "reference voltage" in the following explanation.

From the open state of all switches SW1 to SW4, supposing the resistance value of the resistor Rh1 to be 47Ω, when only the switch SW1 is closed, the resistor Rd (10 kΩ) and the resistor Rh1 (47Ω) are connected in parallel, and the resistance value of the resistor Rd becomes about 47Ω. Accordingly, the voltage supply unit 10b outputs a voltage of about 1.0V at the intersection of the resistor Ra and the diode Vd. Supposing the resistance value of the resistor Rh2 to be 270Ω, when only the switch SW2 is closed, the resistor Rd and two resistors Rh1, Rh2 are connected in parallel. Since the resistance value of the resistors Rh1, Rh2 are added, the resistance value of the resistor Rd becomes about 307Ω. Accordingly, the voltage supply unit 10b outputs a voltage of about 2.3V at the intersection of the resistor Ra and the diode Vd.

From the open state of all switches SW1 to SW4, supposing the resistance value of the resistor Rh3 to be 680Ω, when only the switch SW3 is closed, the resistor Rd and three resistors Rh1, Rh2, Rh3 are connected in parallel. Since the resistance values of the resistors Rh1, Rh2, Rh3 are added, the resistance value of the resistor Rd becomes about 907Ω. Accordingly, the voltage supply unit 10b outputs a voltage of about 3.5V at the intersection of the resistor Ra and the diode Vd. Supposing the resistance value of the resistor Rh4 to be 2.2 kΩ, when only the switch SW4 is closed, the resistor Rd and four resistors Rh1, Rh2, Rh3, Rh4 are connected in parallel. Since the resistance values of the resistors Rh1, Rh2, Rh3, Rh4 are added, the resistance value of the resistor Rd becomes about 2.4 kΩ. Accordingly, the voltage supply unit 10b outputs a voltage of about 4.3V at the intersection of the resistor Ra and the diode Vd.

In the operation unit 10a and the remote control unit 20 thus designed, the resistors Rh1 to Rh4 are connected in parallel to the resistor Rd of the voltage supply unit 10b when any one of the switches SW is closed. By varying the resistance values of the resistors individually, the resistance value of the resistor Rd varies depending on the opened or closed state of the switches SW1 to SW4, so that different voltages can be generated at the intersection of the resistor Ra and the diode Vd of the voltage supply unit 10b. Therefore, by detecting the intersection voltage output from the voltage supply unit 10b, the microcomputer 10e can judge if all switches SW1 to SW4 are open, or which switch is closed.

Figure 3:
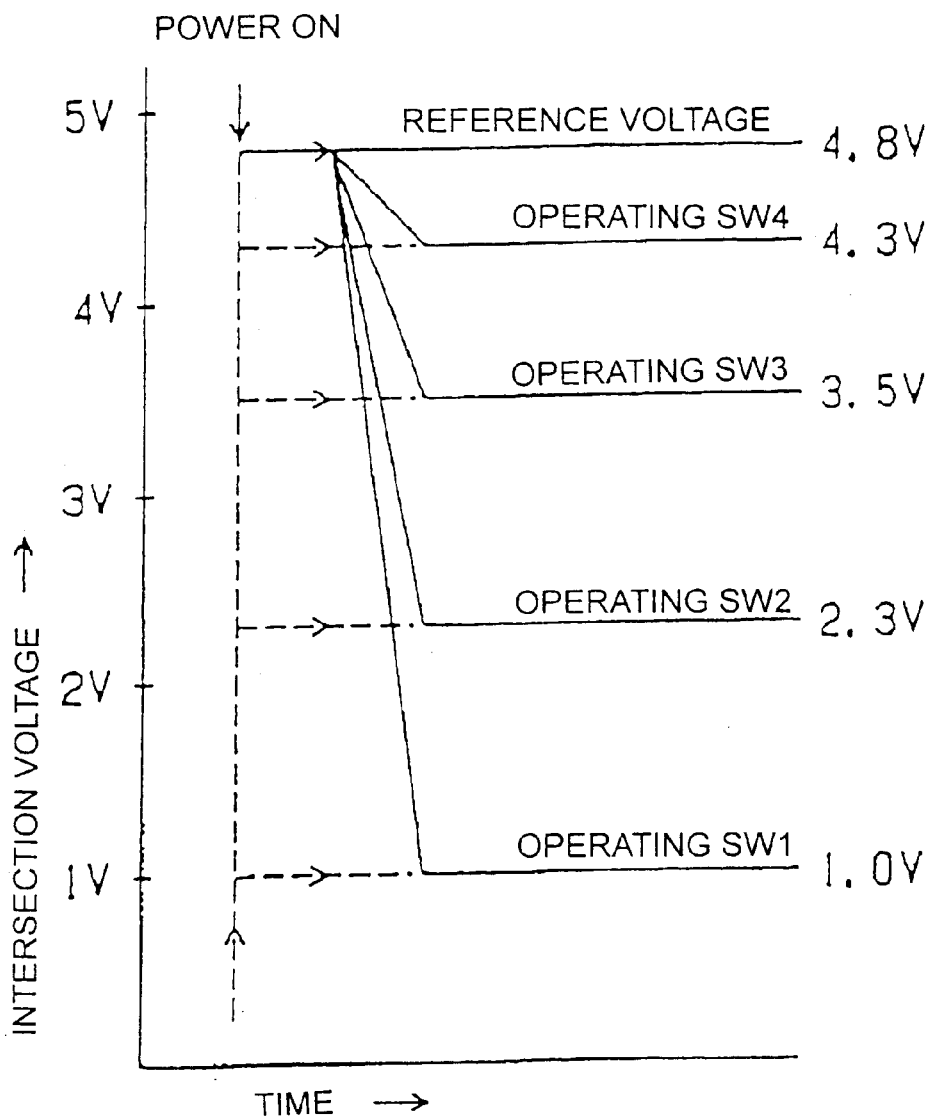
FIG. 3 is a diagram showing changes of an intersection voltage.

FIG. 3 shows changes of intersection voltage of the resistor Ra and the diode Vd with the passage of the time.

As mentioned above, when the power switch 10f is turned on when all of the switches SW1 to SW4 are open, the intersection voltage of the voltage supply unit 10b increases to the reference voltage. Then, when the switch SW3 is closed, that is to say, the UP button 20a is pressed, the intersection voltage of the voltage supply unit 10b decreases from the reference voltage to about 3.5V. By supplying the operation signal according to the duration of operation or number of times of operation of the switch SW3 to the microcomputer 10e, an ordinary volume level rise operation is carried out.

When the UP button 20a is released (the switch SW3 is opened), the intersection voltage of the voltage supply unit 10b increases again to the reference voltage. In this state, when the switch SW2 is closed, that is to say, when the DOWN button of the operation unit 10a is pressed, the intersection voltage of the voltage supply unit 10b decreases from the reference voltage to about 2.3V. By supplying the operation signal according to the duration of operation or number of times of operation of the switch SW2 to the microcomputer 10e, an ordinary volume level fall operation is carried out. It is the same in the other switches SW1, SW4, and the intersection voltage of the voltage supply unit 10b decreases from the reference voltage to the voltage generated when each switch is closed, and the operation depending on the pressing manipulation is carried out.

However, when only the switch SW3 is closed, that is to say, when the power switch 10f is turned on while the UP button 20a is pressed, the intersection voltage of the voltage supply unit 10b is going to rise up to the reference voltage as indicated by dotted line in the diagram, but since the switch SW3 is closed, the voltage becomes about 3.5V. When the power switch 10f is turned on with the switch SW2 in closed state, the intersection voltage of the voltage supply unit 10b is going to rise up to the reference voltage as indicated by dotted line in the diagram, but since the switch SW2 is closed, the voltage becomes about 2.3V. This is the same in the switch SW1 and switch SW4, and the intersection voltage of the voltage supply unit 10b is the voltage generated when the switch is in closed state.

In other words, when the power switch 10f is turned on, that is to say, when power is supplied from the battery 30, the microcomputer 10e detects the intersection voltage, and if the reference voltage is not detected, it is judged that any one of the switches SW1 to SW4 is in closed state, i.e., in pressed state. If anyone of the reference voltage, the voltage of about 1.0 V and the voltage of about 2.3 V is not detected, it is judged that either switch SW3 or switch SW4 is in closed state, i.e., in pressed state. If any one of the reference voltages, the voltage of about 3.5V and the voltage of about 4.3 V is not detected, it is judged that either switch SW1 or switch SW2 is in closed state, i.e., in pressed state.

Figure 4:
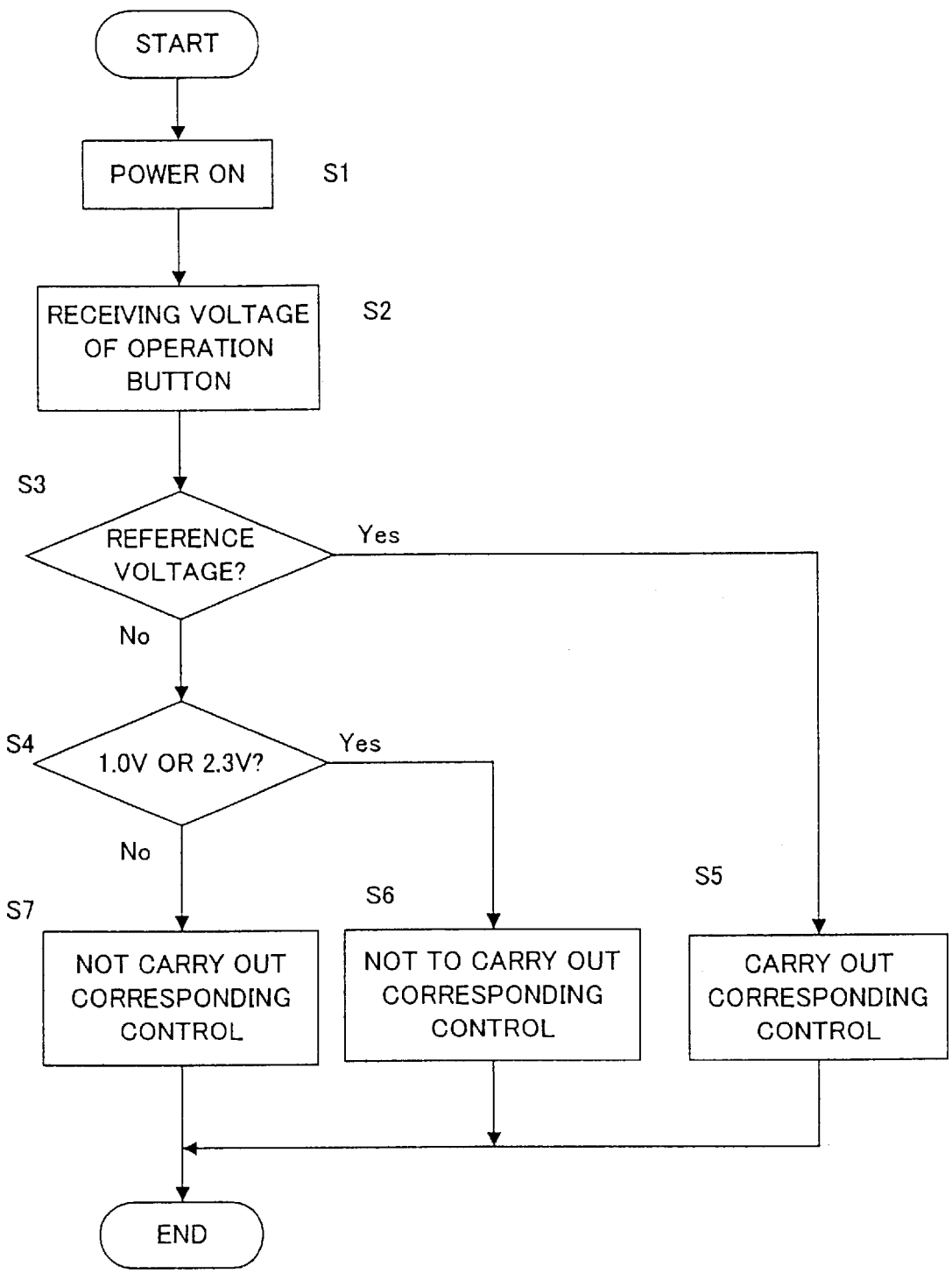
FIG. 4 is a flowchart showing control operation of microcomputer in the embodiment.

The control operation of the microcomputer 10e in this embodiment will be explained according to the operation flow in FIG. 5. The operation flow shown in FIG. 4 is an operation program preliminarily stored in a storage unit (not shown) of the car-mount acoustic device 100, and it is started when the power switch 10f is manipulated.

At step S1, the microcomputer 10e detects that the user turns on the power switch 10f of the device main body 10, and starts to take the intersection voltage output from the voltage supply unit 10b (step S2). At step S3, it is judged if the intersection voltage is equal to the reference voltage or not. If the intersection voltage is judged to be equal to the reference voltage (YES) at step S3, the control operation, that corresponds to the operation signal from the operation button pressed in the operation unit 10a or the remote control unit 20, is executed (step S5).

The control operation corresponding to the operation signal from the operation button pressed in the operation unit 10a or remote control unit 20, i.e., the operation in step S5, will be explained below.

The microcomputer 10e, when receiving an intersection voltage of about 3.5 V from the voltage supply unit 10b, judges that the UP button 20a of the remote control unit 20 is pressed, generates a control signal from the operation signal Se according to the duration of operation or number of times of operation supplied from the switch SW3, and supplies it to the volume control circuit 10d. The volume control circuit 10d increases the output level of the power amplifier 10c on the basis of the control signal supplied from the microcomputer 10e. Alternatively, when receiving an intersection voltage of about 4.3 V from the voltage supply unit 10b, the microcomputer 10e judges that the DOWN button 20b of the remote control unit 20 is pressed, generates a control signal from the operation signal Se supplied from the switch SW4, and supplies it to the volume control circuit 10d. The volume control circuit 10d lowers the output level of the power amplifier 10c on the basis of the control signal supplied from the microcomputer 10e.

Similarly, when receiving a voltage of about 1.0 V from the voltage supply unit 10b, the microcomputer 10e judges that the UP button of the operation unit 10a is pressed, generates a control signal from the operation signal Sh according to the duration of operation or number of times of operation supplied from the switch SW1, and supplies it to the volume control circuit 10d. The volume control circuit 10d increases the output level of the power amplifier 10c on the basis of the control signal supplied from the microcomputer 10e. Alternatively, when receiving a voltage of about 2.3 V from the voltage supply unit 10b, the microcomputer 10e judges that the DOWN button of the operation unit 10a is pressed, generates a control signal from the operation signal Sh supplied from the switch SW2, and supplies it to the volume control circuit 10d. The volume control circuit 10d lowers the output level of the power amplifier 10c on the basis of the control signal supplied from the microcomputer 10e.

Thus, when the power switch 10f is turned on and the intersection voltage is judged to be equal to the reference voltage, the control corresponding to the signal from the operation button pressed in the operation unit 10a or remote control unit 20 is executed, and this process is continued thereafter.

At step S3, when the microcomputer 10e judges that the intersection voltage received from the voltage supply unit 10b is not equal to the reference voltage (NO), the microcomputer 10e judges if the intersection voltage is a voltage of about 1.0 V or a voltage of about 2.3 V. If judged to be neither voltage (NO), that is to say, if judged to be either a voltage of about 3.5 V or a voltage of about 4.3 V, the control operation corresponding to the operation signal Se from the operation button pressed in the remote control unit 20 is not carried out (step S6).

The process of not carrying out control operation about the operation signal Se from the operation button of the remote control unit 20, i.e., the process in step S6, will be explained.

When the power switch 10f is turned on, the switch SW3 or switch SW4 is closed, that is to say, the UP button 10a or DOWN button 20b of the remote control unit 20 is in pressed state, and the operation signal Se by pressing of the UP button 20a or DOWN button 20b is supplied into the microcomputer 10e. However, before the operation signal Se is supplied, the microcomputer 10e already recognizes that the operation button supplying this operation signal Se has been in pressed state. Therefore, the microcomputer 10e does not generate the control signal for this operation signal Se, so that no control is executed on the volume control circuit 10d.

Thus, the operation in step S6 is terminated. Thereafter, the microcomputer 10e carries out control operation only on the operation signal Sh from the operation buttons of the operation unit 10a mentioned above.

At step S4, when the microcomputer 10e judges that the intersection voltage received from the voltage supply unit 10b is either a voltage of about 1.0 V or a voltage of about 2.3 V (YES), that is to say, neither a voltage of about 3.5V nor a voltage of about 4.3V, control operation is not carried out for the operation signal Sh from the operation button pressed in the operation unit 10a (step S7).

The process of not carrying out control operation about the operation signal Sh from the operation button of the operation unit 10a, i.e., the process in step S7 will be explained.

When the power switch 10f is turned on, the switch SW1 or switch SW1 is closed, that is to say, the UP button or DOWN button of the operation unit 10a is in pressed state, and the operation signal Sh by pressing of the button is supplied into the microcomputer 10e. However, before the operation signal Sh is supplied, the microcomputer 10e already recognizes the operation button supplying this operation signal Sh is in pressed state, and the control signal about this operation signal Sh is not generated, so that no control is executed on the volume control circuit 10d. Thus, the operation in step S7 ends.

Thereafter, the microcomputer 10e carries out control operation only on the operation signal Se from the operation buttons of the remote control unit 20 mentioned above.

In this manner, when the power switch 10f is turned on, the microcomputer 10e detects the change of intersection voltage from the voltage supply unit 10b, and judges presence or absence of operation button that has continuously been in the pressed state due to trouble or which operation button has been in the pressed state, thereby to perform no control corresponding to the operation signal from the operation button kept in pressed state. Therefore, if the power source is turned on while the volume UP button for increasing the volume level of the power amplifier is kept in pressed state, when hearing the sound delivered from the speaker, creation of intolerable situation for the user can be prevented.

In this embodiment, when the power switch 10f of the device main body is turned on, the microcomputer 10e carries out control operation. However, this invention is not limited to this example, and, for instance, the microcomputer 10e may be designed to carry out control operation when the ACC switch provided in the vehicle is turned on.

The embodiment of the invention is applied to the car-mount acoustic device, but not limited to this example, the invention may be applied in various electronic devices having operation buttons manipulated by pressing, within the scope and true spirit of the invention.

According to the electronic device of the invention, if an electric power is supplied in a state of an operation button being kept in pressed state, control operation about the operation signal from such operation button is not carried out by the microcomputer. For example, if such operation button is a volume UP button to be manipulated for increasing the volume level of the power amplifier, when hearing the sound delivered from the speaker, creation of intolerable situation for the user can be prevented.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2000-398642 filed on Dec. 27, 2000 including the specification, claims, drawings and summary is incorporated herein by reference in its entirety.

What is claimed is:

1. An electronic device comprising:
   an operation button to be manipulated by pressing;
   a judging unit for judging whether or not a voltage changed by pressing the operation button is equal to a specified value when an electric power is supplied; and
   a control unit for preventing a control corresponding to the signal from the operation button in pressed state from being executed when the judging unit judges that the voltage is not equal to the specified value.

2. The electronic device according to claim 1, wherein the specified value is a voltage showing the state that the operation button is not pressed.

3. An electronic device comprising:

a first operation button provided in a device main body to be manipulated by pressing;

a second operation button provided at a position remote from the device main body to be manipulated by pressing;

a judging unit for judging whether a voltage changed by pressing of the first operation button and second operation button is equal to a first specified value or a second specified value when an electric power is supplied; and a control unit for preventing a control corresponding to the signal from the second operation button in pressed state from being executed when the judging unit judges that the voltage is not equal to the first specified value, and for preventing the control corresponding to the signal from the first operation button in pressed state from being executed when the judging unit judges that the voltage is not equal to the second specified value.

4. The electronic device according to claim 3, wherein the first specified value is a voltage showing the state that the second operation button is not pressed, and the second specified value is a voltage showing the state that the first operation button is not pressed.

* * * * *